United States Patent [19]

Kuhn et al.

[11] 4,344,031
[45] Aug. 10, 1982

[54] METHOD AND DEVICE FOR VERIFYING SIGNALS, ESPECIALLY SPEECH SIGNALS

[75] Inventors: Michael Kuhn, Hamburg; Ernst Bunge, Rheinbach, both of Fed. Rep. of Germany

[73] Assignee: U.S. Philips Corporation, New York, N.Y.

[21] Appl. No.: 149,869

[22] Filed: May 14, 1980

[30] Foreign Application Priority Data

May 18, 1979 [DE] Fed. Rep. of Germany ....... 2920041

[51] Int. Cl.$^3$ ............................................ G01R 23/16
[52] U.S. Cl. ................................. 324/77 R; 324/77 B
[58] Field of Search ............... 324/76 R, 77 R, 77 A, 324/77 B, 77 D

[56] References Cited

U.S. PATENT DOCUMENTS 4,057,756  11/1977  Ley .................................. 324/77 B

*Primary Examiner*—Michael J. Tokar
*Attorney, Agent, or Firm*—James J. Cannon, Jr.

[57] ABSTRACT

The characteristic values are obtained from the signal to be verified, e.g. in the case of a voice signal the total energy in the individual frequency spectrum ranges, and these characteristic values are quantified. The frequency with which the individual partial ranges of the quantified characteristic values occur is found during a sampling phase, and these frequencies are stored. In the test phase, the signal is analyzed in the same way and the stored frequencies of the partial ranges into which the characteristic values of the signal to be verified have fallen are multiplied and compared with a threshold. In an arrangement for implementing the method, there is a characteristic store with a store address for a multi-digit binary number for each partial range of each characteristic. This store is addressed by a counter, the positions of which are allocated to the individual characteristics or spectrum ranges of the voice signal, and by the numbers of the partial ranges of the characteristics found during the analysis into which the characteristic values of the signal to be analyzed have fallen. In the sampling phase the content of each addressed store address is raised by 1 and in the test phase the frequencies obtained in the store addresses addressed are multiplied together. When a voice signal is processed for verification of the speaker, with the stepwise formation of the long-term spectrum, the intermediate values are compared with a range limit of a partial range read out from a range limit store and increased by 1 on exceeding a number allocated to this characteristic in an intermediate store. In this manner, it is possible at the end of the voice signal, immediately and without any further processing steps to obtain the quantified characteristics in the form of the numbers of the partial ranges which can then be used to increase the frequencies in the characteristic store. A summation over all spectrum values is made to standardize the incoming voice signals. Subsequently, to all spectrum values is added a given fraction of their value, performed in the simplest manner by position shifting, until the sum of all spectrum values exceeds a predetermined constant. Thus the determination of the quantified characteristics or the partial range sums is immediately effective. The multiplication of the frequencies may be replaced by the addition of the logarithmic frequencies.

12 Claims, 11 Drawing Figures

4,344,031

METHOD AND DEVICE FOR VERIFYING SIGNALS, ESPECIALLY SPEECH SIGNALS

BACKGROUND OF THE INVENTION

The invention relates in general to the verifying of signals, notably of signals with various features, whereby each of these features may be subject to quantitive variability. Such signals may originate from differing signal sources. The features may, for example, involve frequencies, amplitudes, pulse shapes or the time-dependency of a signal. The frequencies may occur at varying amplitudes or over varying periods. The amplitudes may occur for varying periods or at different intervals. The pulse shapes may vary in amplitude, slope, or the number of repetitions of the same pulse. The variability may be caused by random effects and also by slow changes, e.g. aging. Both effects may occur together. Examples of such signals needing verifying are those obtained during character recognition, sound analysis and speaker verification.

By verifying here is meant a test whether or not a signal originates from a pre-indicated source. Such a problem arises in the classification of signals where a test is to be made to find out whether a signal belongs to a pre-indicated group of classes and, if so, to which one. In both cases the features or values of the features occurring in the class or classes is first determined by means of a number of exemplary samples and these values must be stored, so that they can subsequently be compared with the values of the features of the signal to be verified. Here, the individual values of the features may be stored either directly or in a derived form, e.g. as an average with variance.

SUMMARY OF THE INVENTION

In many instances in practical use, the storage capacity available for the values or derived values is restricted. Moreover, the quality of a verification or classification, i.e. the ratio between correct and incorrect recognitions or unjustified rejects, depends to some extent on the number of features and their values which have been investigated and hence stored.

It is therefore the object of the invention to provide a method of the type described in the preamble in which only a small number of data need be stored, while providing a highly reliable identification. This object is achieved in that the method according to the invention comprises the following steps:

a. In a learning phase, a predetermined number of signal patterns is supplied and for each characteristic a histogram is drawn up giving the number of times that the characteristic concerned had a value within a range of values of a collection adjacent value ranges applicable to the feature;

b. In a test phase, the signal pattern to be verified is supplied and the value is detected for each of said characteristics in order to indicate the value range belonging to said feature within the collection appropriate to said feature;

c. The histogram values of the value ranges thus indicated for all said features of the signal to be verified are multiplied to give an end product wherein every factor of said product is different from zero;

d. Finally, said end product is compared with a standard value in order to signal verification only if the standard value is exceeded.

This invention represents a technical application of the Bayes algorithm in which a signal is verified if the probability that the signal to be verified belongs to a or the given class is greater than a predetermined threshold. The probability is given by the product of the individual probabilities for the individual features. Here, the individual probabilities are the frequencies with which, in the learning phase, values of features fell into the partial range into which the feature value(s) of the signal to be verified also fall(s).

It is often possible for the individual signals to differ in that the values of the individual features are shifted by a proportionality factor caused by the generation of the signal, e.g. by a change in electronic or other amplification factors. Such a scale factor must be eliminated before the signal is processed by standardization. To this end, it is best in order to standardize a signal pattern supplied, the detected value of each feature is multiplied by a factor $(1+e)$ where $e < 21$ 1 to give a corrected value, and this is repeated each time for all corrected values thus found until an aggregate value derived from the corrected values applying exceeds an aggregate threshold. In this manner, the values of all features are shifted by the same factor. It is generally sufficient for this purpose to derive the total signal value from a summation of the feature values. Further details of the invention.

As the similarity threshold depends on the frequency distribution of the feature values and especially on the maximum occurrency values occurring, it is best to find the similarity threshold after the learning phase from the multiplication of the maximum occurrency value of the individual features. Here, the product of the maximum occurrency values is multiplied by a factor lower than one in order also to make some allowance for differences between the signal to be verified and the standard signals.

To improve the quality of verification during operation, it is best to follow a successful check by a further learning phase in which the occurrency values of those partial ranges into which the characteristic values of the signal to be verified have fallen are increased by 1. In this manner, the checked signal is also used as a learning signal. Here, of course, the similarity threshold must be re-determined each time. It is a good idea here to divide all frequencies by a constant divisor when a occurrency value exceeds a predetermined value, which value may be the maximum which the store will accept. Here again, the similarity threshold must be recalculated.

One particularly important use for the method of the invention is the recognition or verification of a speaker. Here it is best if the signal is a speech signal of limited duration and the features are adjacent frequency spectrum ranges, whereby the energy of the speech signal is separately integrated in consecutive periods per spectrum range and the integrals are summated separately over the entire voice signal and represent the voice spectrum sums of the feature values. In toto, these spectrum sums represent the long-term spectrum of the voice signal.

A simple construction is obtained if, in order to establish the partial ranges in which the individual spectrum sums fall, the partial sum obtained during the voice signal for each spectrum range after evey summation of a further integral is compared with the upper limit of a partial range and the content of an intermediate storage area allocated to the appropriate spectrum range is increased by 1 if the partial sum exceeds the limit and thereafter the comparison with the upper limit of the next higher partial range is made. In this manner, the partial range virtually limits progress with the individual spectrum ranges so that it is not necessary at the end of the voice signal to compare the value of each characteristic in succession with all the partial ranges. It is a good idea if the steps of the method are also performed during the aforementioned standardization. The entire cycle then takes place as in the analysis of the voice signal, and thus no special equipment is required.

This method of voice checking can also be used for a "voice ID". Here it is best for the frequencies obtained during the learning phase to be stored on a data support and automatically read in and stored for checking before or during the feed-in of the voice signal to be checked. Here, the data support is the ID on which the frequencies are magnetically stored or electrically stored on a semiconductor.

BRIEF DESCRIPTION OF THE DRAWINGS

Embodiments of the invention will now be explained in greater detail with reference to the drawings, in which show:

FIGS. 1, 1a, 1b and 1c are examples of the frequency distribution of three characteristics in a signal.

FIG. 9 is an arrangement for verifying a signal. Description of the.

FIG. 1 shows three different histograms (a), (b) and (c), representing the frequency distribution f(P) of characteristics P(f1), P(f2), P(f3) for three different characteristics (f1, f2, f3), e.g. for an individual signal source. In a voice checking system, these three characteristics may each represent a spectrum range of the long-term spectrum of a voice signal of the speaker concerned, i.e. the characteristic is a frequency-spectrum range and the value of the characteristic is the total energy of the voice signal in the appropriate spectrum range. The ordinates P(f1), P(f2), P(f3) on which the spectrum energy is entered as a characteristic value have been divided here for the sake of simplicity into equal partial ranges, which, however, need not necessarily indicate equal value intervals, i.e. the values may be entered on a non-linear scale.

Within the appropriate value region for P(f1, 2, 3) in all three diagrams the actual number of signals with a characteristic value in the appropriate partial range is increased by 1 so that every partial range has a frequency of at least 1 even if none of the sample signals has a characteristic value in the partial range concerned. It will therefore be seen from the diagrams that sample signals were used in the example shown. The use of an initial value which is not zero is because during verification (test phase), the frequencies of the partial ranges formed in the learning phase in which the characteristic values of the signal to be checked fall must be multiplied by one another. If a characteristic value of the signal to be checked falls into a partial range in which the sample signal has not occurred, the multiplication of the unincreased frequencies would always result in a total of zero, regardless of the frequencies arising as multiplication factors from the other characteristics. With the use of a minimum of 1 it is possible, for instance, if both other characteristics exhibits the maximum frequencies, for the total still to exceed the threshold. There is another way of avoiding having to multiply by zero. For example, a resultant factor zero may simply be ignored.

Figure 1A:
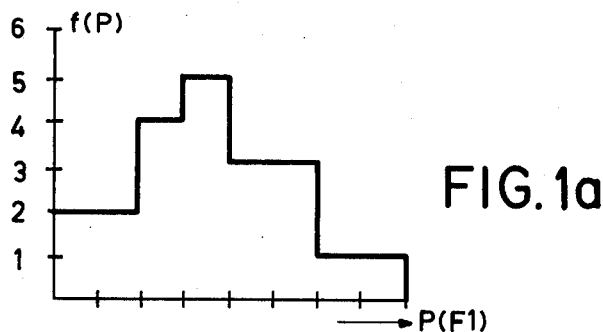
Figure 1B:
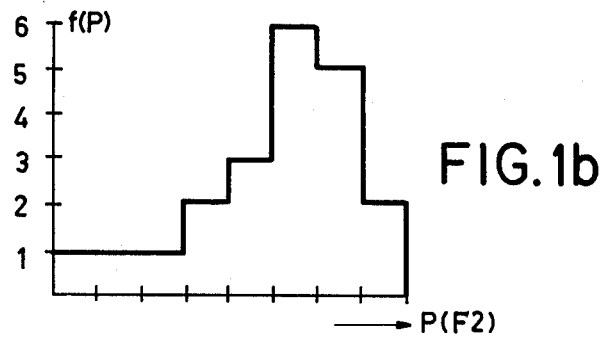
Figure 1C:
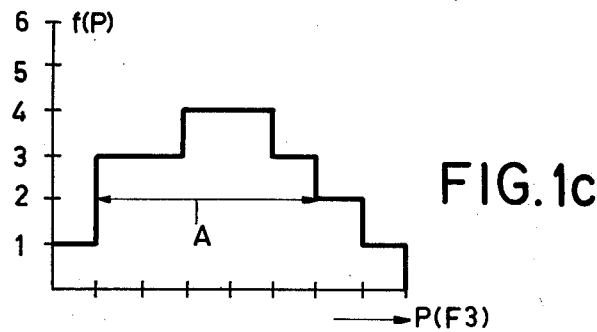

From the examples shown it may be seen from FIG. 1a that there is a marked concentration in the middle of the partial ranges, while in FIG. 1c there is a marked predominance at high values, i.e. in the sample signals, this characteristic occurs predominantly at high values. On diagram c, on the other hand, there is a less marked concentration in the median range, i.e. with this characteristic the characteristic values of the sample signal exhibit marked scatter and the maximum frequency is at its lowest, i.e. 4. This characteristic makes the least contribution to the resolution of the checking system. The arrow shows the ordinate range where the multiplication factor to be used includes only a range between 3 and 4. Description of a preferred embodiment.

Figure 2:
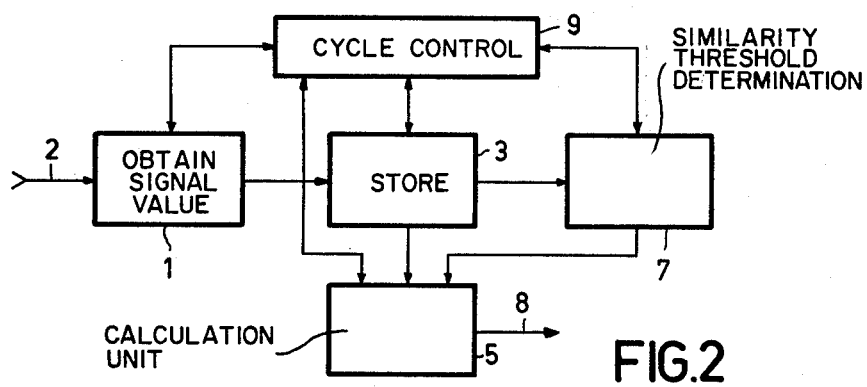
FIG. 2 is a block circuit diagram of an overall verification arrangement.

FIG. 2 is the block circuit diagram of an overall all arrangement for verification designed for an easier understanding of the way in which the detailed partial arrangements shown in the subsequent drawings work together. The signals, both the sample signals and those to be checked, are taken via input 2 to block 1 where the values of the individual characteristics of each signal are obtained. In addition, the characteristic values are quantified. The quantified characteristics are sent to unit 3 which comprises a characteristic store which has storage space for a multidigit number for each partial range of each characteristic. When a quantified characteristic value is fed in, the frequency stored in the appropriate partial range of the characteristic is increased by 1. At the end of the learning phase and the conclusion of the evaluation of a predetermined number of sample signals, the maximum frequencies of all characteristics contained in the characteristic store are taken to a unit 7 which determines the similarity threshold by the multiplication of all the maximum frequencies. The signals to be checked can now be fed in. As before in the learning phase, the characteristic values are obtained from them in unit 1 and taken again to unit 3 with the characteristic store. Then the frequencies still present in the characteristic store from the learning phase are addressed and read out, and taken to a calculation unit 5 which multiplies the frequencies received from characteristic store 3 and compares the product with a similarity threshold determined in and supplied by unit 7. If the product is higher than the similarity threshold, a "recognised" signal is given on output line 8. For the control of the individual processes and to change over from the learning to the checking phase there is a cycle control 9 which supplies control signals to units 1, 3, 5 and 7 and receives return and particularly end signals from them. This cycle control may, for instance, contain a counter with output decoders connected thereto. The counter record is increased by the signals obtained from units 1, 3, 5 and 7. Depending on the position of the counter, the output decoder provides control signals for units 1, 3, 5 and 7. At the end of the recognition process, unit 9 is reset to its initial position. A reset line (not shown) may also be provided to start a new learning phase.

Figure 3:
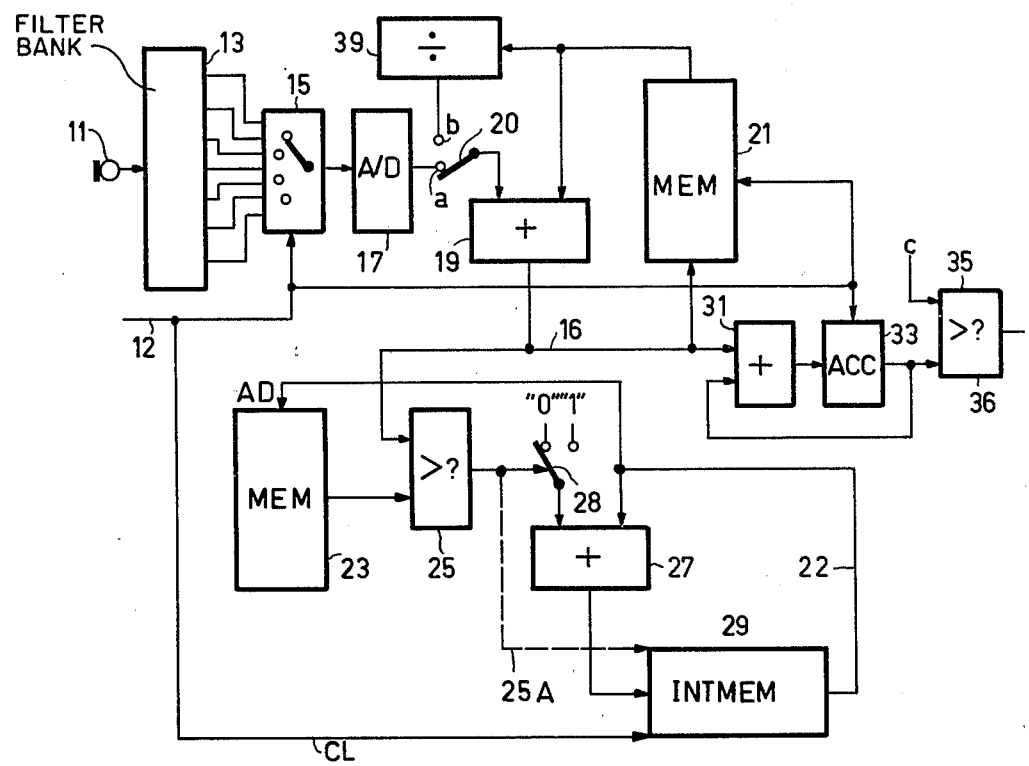
FIG. 3 is an arrangement for finding the partial ranges of the characteristics for a voice recognition system.

FIG. 3 shows a partial arrangement for determining the characteristic values of voice signals for a voice recognition system. The voice signal is picked up by a microphone 11 and fed to a filter bank 13 which breaks the voice signal down into individual frequency spectrum ranges and integrates the energy of each spectrum range over a predetermined time. The integrated values appear at separate outputs each allocated to another spectrum range and connected to a multiplexer 15. Multiplexer 15 is controlled by a beat signal on line 12 and within the predetermined integration time of the filter bank scans all outputs in succession and connects them to an analog-digital converter 17. After the scanning of each output, the appropriate integrator in the filter bank is reset to zero; the appropriate control signal may be derived from the beat signal on line 12.

The output of analog-digital converter 17 is connected via a changeover switch 20, here shown in the lower position, to one input of a binary number adder 19, the output line 16 of which is connected to the data input of a store 21 and the other input of which is connected to the data output of said store. Store 21 is also controlled by the beat signal on line 12 and contains a number of store addresses equal to the number of outputs of filter bank 13, i.e. one storage address for a multi-digit binary number for each spectrum range. The beat signal on line 12 causes the contents of the store addresses to be sent in synchronism with the scanning of the filter bank outputs by multiplexer 15 to the data output and thus to the other input of adder 19, so that the integrated value of a spectrum range is added to the so far determined intermediate sum of this spectrum range and taken once more via line 16 to store 21. Store 21 can thus be a multi-stage shift register in which the content is shifted in parallel by one position with every beat signal on line 12 and thus the value at the data output is erased and the value taken to the data input via line 16 written in afresh. Store 21 may also be a matrix store. Thus the long-term spectrum of the voice signal is produced in store 21. Output line 16 of adder 19 is also connected to the input of a comparator 25, the other input of which is connected to the output of range limit store 23. The output of comparator 25 controls an arrangement consisting of further adder 27 and intermediate store 29, the data output of which is connected via line 22 to the input of adder 27 and the address input of range limit store 23. The range limit store has values stored at consecutive addresses (0, 1, etc.) for range limits, thus giving intervals for the frequencies of the long-term spectrum. If the value of the binary number on line 16 exceeds the value of the binary number read out from the range limit store, changeover switch 28 is temporarily set to the right-hand position and adder 27 adds 1 to the figure read out from intermediate store 29, which had the value 0 at the start of the voice signal, and rewrites the increased number in. If the value on line 16 does not exceed the binary number from range limit store 23, changeover switch 28 remains in the left-hand position shown and the number read out from intermediate store 29 is rewritten in unaltered. This process takes place cyclically in succession for all spectrum ranges. If, therefore, during the next cycle the next energy value provided by filter bank 13 for a spectrum range which had previously caused the appropriate value in store 29 to be raised, is added to the intermediate sum of this spectrum range in store 21, line 22 carries a value increased by 1 over the previous one, so that the next range limit is read out from range limit store 23 and taken to comparator 25. In this way separate determinations are made for all spectrum ranges on the number of range limits that have been exceeded, which immediately gives the actual frequency partial range of the spectrum range concerned at the end of the voice signal.

Intermediate store 29 may take the same form as store 21 and for every spectrum range has a store address which must take a binary number with a maximum value of the number of partial ranges of the entire value range of the individual spectrum ranges. The choice of this number of partial ranges will be explained in greater detail with reference to FIG. 5.

Intermediate store 29 may therefore be a shift register, the beat input of which receives the beat signals on line 12 and thus shifts its content in parallel and rewrites in the number provided by adder 27, or a free access store, the storage addresses of which are cyclically addressed in succession by the beat signals on line 12. In this case, the input of adder 27 connected to changeover switch 28 may also be permanently connected to signals corresponding to the number 1, and comparator 25 merely controls the writing in of the value supplied by adder 27 via broken line 25A if the number supplied on line 16 by adder 19 is greater than the region limit just addressed, whereas otherwise the appropriate value in intermediate store 29 is merely read out as negligible and not transferred.

It should be pointed out that lines carrying signals corresponding to binary figures, e.g. especially lines 16 and 22 together with the output lines of analog-digital converter 17 and stores 21 and 23, actually consist of several individual connections on which the binary numbers are carried in parallel. For the sake of simplicity, such lines are shown simply as one on FIG. 3 and the successive drawings.

It is possible in recording voice signals via microphone 11, e.g. owing to the distance between the speaker and the microphone during speech, for there to be absolute differences in volume in different voice samples. It would then be possible that, the individual spectrum ranges which should substantially have the same values in different voice signals relatively to one another might have values falling into different partial ranges. Thereby in the learning phase the frequency distribution is extended over the individual partial ranges thus reducing the accuracy of verification, or, during the test phase, a speaker is incorrectly unrecognised because of such absolute differences in volume. For this reason, a standardization process follows the recording of each voice signal. To this end output line 16 of adder 19 is connected to the input of an additional adder 31, the output of which leads to a store (accumulator) 33 for a multi-digit binary number, and the output of this store 33 is connected to the other input of adder 31. Store 33 is also connected to line 12, so that the value provided by adder 31 is written in on every beat signal. In this manner, at the end of the voice signal store 33 receives the sum of the energies of all spectrum ranges over the entire voice signal. This sum is also taken to a comparator 35 and compared there with a set constant C. This constant C is selected empirically with the aid of several voice samples so that it is not reached by the value in store 33 at the end of the voice signal.

Changeover switch 20 is reset, e.g. by a signal derived from the lack of a further voice signal from the microphone 11, into position b and the individual spectrum values of the long-term spectrum are read out in succession from store 21. These values are taken to adder 19, both directly, as during the period of the voice signal, and via a divider arrangement 39 and changeover switch 20. Their divisor is preferably a whole power of 2, e.g. $2^4 = 16$, so that divider arrangement 39 merely shifts the binary numbers read out from store 21 by the appropriate number of positions. This fraction determined by divider arrangement 39 is added to the appropriate spectrum value of the long-term spectrum and also written into store 21, taken to adder 31 and added to the content of store 33. With a divisor of 16, the values stored in store 21 are thus multiplied by 17/16. This is performed in succession with all the spectrum values of the long-term spectrum contained in store 21 and repeated cyclically until, at the end of such a cycle, the value in store 33 exceeds constant C. As soon as this happens, comparator 35 emits a signal on output line 36 which may, for instance, be taken to cycle control 9 of FIG. 2 which signals that the standardization procedure is completed. As the exceeding of the constant generally takes place only in a spectrum range within the whole of the spectrum, i.e. not precisely at its last spectrum range, the remaining spectrum ranges must also be processed. Here, constant C may well be further exceeded, but it now represents only a rough limit value and the extent of the excess may be kept low by a suitably large divisor in divider arrangement 39. In any event, the number of processing steps in the standardization procedure is thus increased. Here, the absolute value of the fraction is sent by divider arrangement 39 to adder 19, becoming larger as the standardization process proceeds. At the end of this process, changeover switch 20 is reset to the lower position.

In parallel with the standardisation process, the comparison with the range limits also takes place in comparator 25, for this device makes no distinction whether the binary number appearing on line 16 occurs during the initial processing of a voice signal or only on standardization. If, therefore, a range limit is exceeded during standardization, the corresponding number in store 29 for the spectrum range in question is raised by 1. Thus store 29 receives at the end of the standardization procedure the energy values, quantified on the partial ranges, of the spectrum fractions of the standardization long-term spectrum in store 21 which can then be taken to the characteristic store, as described later.

Figure 4:
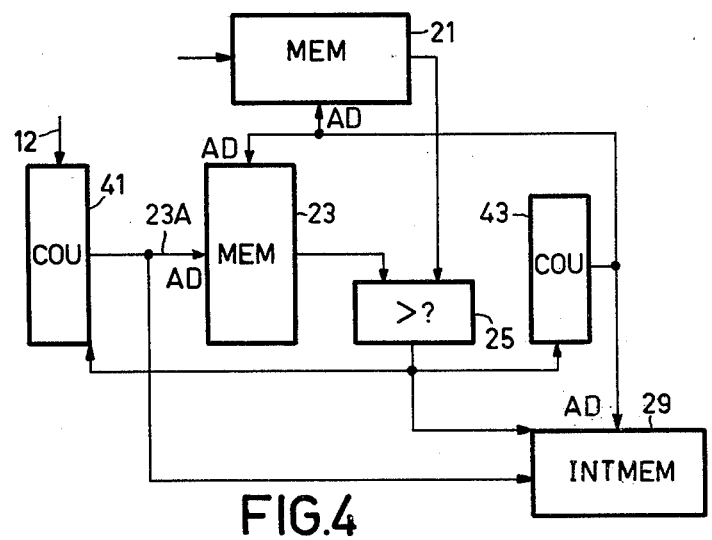
FIG. 4 is another arrangement for finding the partial ranges.

An arrangement for another way of determining and quantifying the characteristic values is shown on FIG. 4. This arrangement is particularly suitable where the values of the individual characteristics are not summated in succession in time, but it can also be used instead of the partial arrangement described above for voice checking. Here, the components corresponding to the arrangement of FIG. 3 are given the same references.

The basic assumption is that store 21 contains the values of all the characteristics of a signal stored in succession. Like range limit store 23 and intermediate store 29, store 21 is assumed to be of the random-access type addressed by counter 43. Each position of counter 43 then corresponds to a given characteristic, e.g. a given spectrum range in the previously described processing of a voice signal. Range limit store 23 contains several different range limits for the individual characteristics or spectrum ranges, whereby the individual range limits within the store address of each characteristic are addressed by counter 41 via a further address input 23A of range limit store 23. Both address inputs are the higher or lower value address input lines of ordinary stores.

For the purposes of explaining operation, it will first be assumed that both counters 41 and 43 are in the initial position, and this can be achieved by a suitable reset line (not shown). Thus the value of the first characteristic is read out from store 21 and in range limit store 23 the upper range limit of the first characteristic is read out, both values being fed to comparator 25. Counter 41 now receives a beat pulse shifting the counter via line 12, so that the range limits of the first characteristic are read out in succession and taken to comparator 25, while store 21 also gives out the value of the first characteristic at the output. As soon as a range 1 limit is read out from store 23 which is larger than that from store 21, comparator 25 produces an output signal which writes in the position of counter 41 taken to the data input of store 29 in its first store address addressed by counter 43, while moreover counter 41 is reset to the initial position and counter 43 is shifted on by one position, with a delay if necessary to ensure writing into store 29.

The value of the second characteristic is now read out from store 21 and, in range limit store 23, the range limits of the second characteristic are addressed and read out in succession via counter 41, now once more counting in the high range, and taken to comparator 25 until once again a range limit greater than the characteristic value occurs. The counting position of counter 41 is then entered in the second store position of store 29, etc., until counter 43 has passed through all its positions and all characteristics have been compared with the appropriate range limits. Thus store 29 receives for every characteristic the number of the partial range in which the characteristic value concerned has fallen.

The range limits of the partial ranges of the individual characteristics may be set in various ways, e.g. by the uniform division of the entire value range or by a logarithmic division. It is best, however, to select the range limits so that each partial range occurs with about the same frequency.

Figure 5:
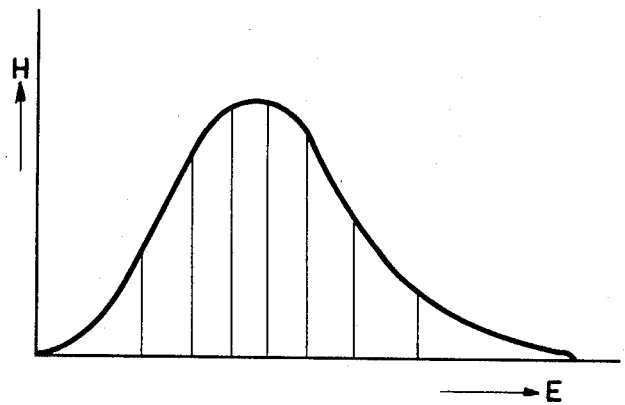
FIG. 5 is a graph explaining the discovery of the range limits.

To this end, many signals are analysed, e.g. in the voice checking system, several different voice signals from a number of different speakers. The frequency H of the occurrence of the individual energy values E are entered for every characteristic or every spectrum range. An example of such a curve is given on FIG. 5. The area beneath the curve is now divided into such sections that the individual partial areas are of the same size. The division on FIG. 5 is into eight equal areas. The separating lines between the partial areas then determine the range limits of the partial ranges. As the frequency distribution of the energy values of the individual characteristics will generally differ for different characteristics, there are different partial ranges or range limits for different characteristics. These range limits are then constant for the further use of the system, so that range limit store 23 may be a fixed value store. It should be pointed out that FIG. 5 applies to several speakers, while FIG. 1 applies to one only.

Figure 6:
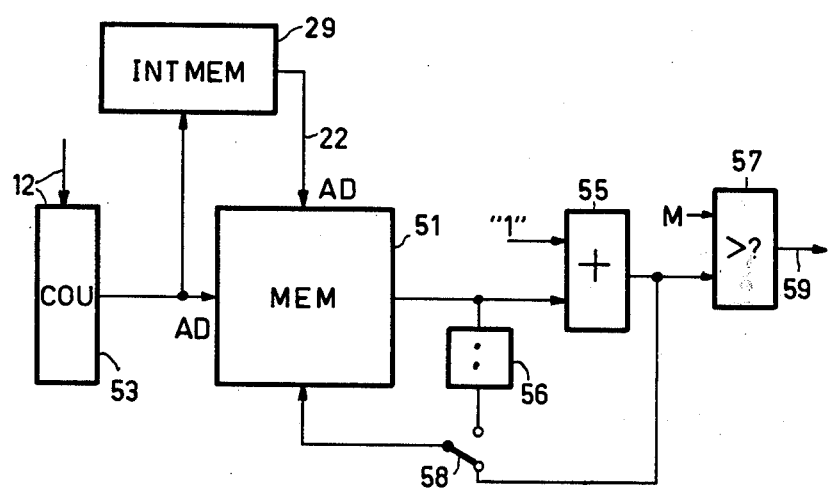
FIG. 6 is an arrangement for writing the frequencies into the characteristic store.

FIG. 6 shows an arrangement with which the numbers of the partial ranges obtained in intermediate store 29 and into which the characteristics of the signal investigated have fallen may be used to summate the frequencies in the individual partial ranges. These frequencies are stored in characteristic store 51 which has one storage address for a multi-digit binary number for each characteristic and each partial range. The store address for a given characteristic is selected by addressing from counter 53, which also addresses intermediate store 29. The store addresses for the partial ranges within a characteristic are selected via line 22 from intermediate store 29. As in the addressing of range limit store 23 of FIG. 4, this addressing may be regarded as the separate addressing of rows and columns in a correspondingly matrix-divided store, where the whole of the address input lines of the store are divided into low and high-value address lines and connected to line 22 or the output of counter 53. For the purposes of operation, it will first be assumed that characteristic store 51 contains a 1 everywhere before the first signal, and this can be done with a signal on a reset line (not shown). Thus counter 53 is in the initial position, so that the partial ranges of the first characteristic are addressed in characteristic store 51 and the number of the partial range of the first characteristic is read out from intermediate store 29 and taken via line 22 to one address input of characteristic store 51, whereby the store address for the appropriate partial range of the first characteristic is addressed. The content of this store address is read out and sent to an adder 55, the other input of which permanently contains the value 1. Thus at the output of the adder 55 appears the content of the addressed store address, increased by 1, and is written thereinto, erasing the former content. Thus is the frequency of this partial range increased by 1.

A beat signal on line 12 shifts counter 53 on by one position, so that the store address for the next characteristic in intermediate store 29 and characteristic store 51 is addressed, while via line 22 the partial range of this characteristic is selected and raised by 1 via adder 55, and so forth until all characteristics have been processed. The characteristic values of a signal supplied are taken into account in the stored frequencies of the partial ranges, and the next signal can be supplied. Components 56 to 59 are explained at the end of the description.

Figure 7:
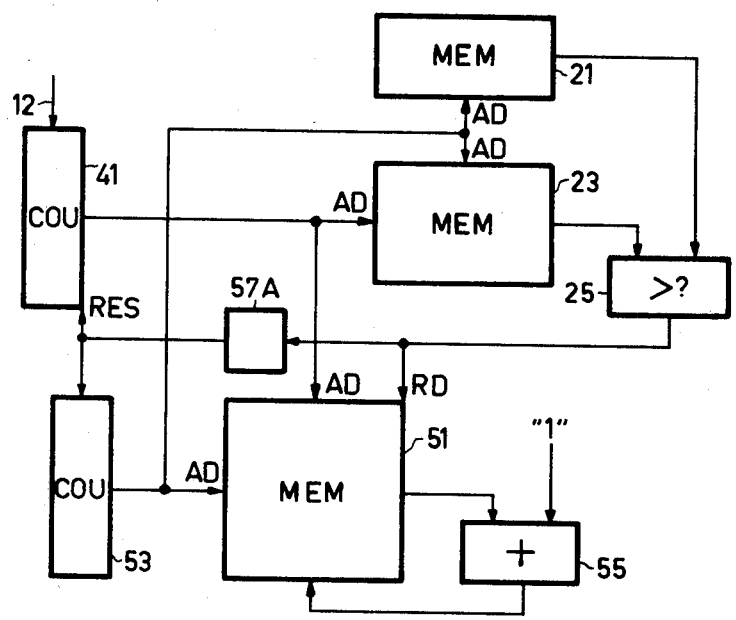
FIG. 7 is an arrangement for finding the partial ranges of the characteristics and for simultaneous writing into the characteristic store.

Another type of arrangement to determine the frequencies of the individual partial ranges of the characteristic values of signals is shown on FIG. 7, in which there is no intermediate store. The arrangement of FIG. 7 to some extent corresponds to a combination of those of FIGS. 4 and 6, and identical components have been given the same references. As with the arrangement of FIG. 7, it is once more assumed that store 21 contains the values of all the characteristics of a signal supplied. In the case of voice signal, for instance, these characteristic values may be generated by the partial arrangement shown on the upper half of FIG. 3. A counter 53 is fitted for common addressing both for this store 21 and for range limit (23) and characteristic (51) stores. This counter again addressed the store addressed for all partial ranges of a characteristic in both range limit (23) and characteristic (51) store. Further address inputs of this store for addressing the partial range within a characteristic are connected to the output of counter 41 which receives a beat pulse as a counting beat via line 12.

At the start both counters 41 and 53 are in the initial position, so that the storage addresses in all stores are addressed for the first characteristic or the first partial range therein. The value of the first characteristic is taken to comparator 25 from store 21 and the first and with the next beat signal on line 12 the following range limits from range limit store 23. As soon as a range limit occurs which is greater than the characteristic value from store 21, the content of the store cell of characteristic store 51 then addressed by counters 41 and 53 is read out and applied to adder 55, which re-emits this value, increased by 1, at the output and supplies it to the data input of characteristic store 51 where this raised value is once more written into the original storage address. In addition, the output signal of comparator 25, which is delayed in delay device 57A by a time sufficient for the read/write process in characteristic store 51, resets counter 41 to the initial position via reset input R and shifts counter 53 on by one position. All characteristics are processed in succession in this manner.

After a number of signals of a class, e.g. a number of voice samples of a speaker, has been processed during the sampling phase, it is then necessary to determine the similarity threshold for the subsequent checking process. The arrangement shown on FIG. 8 may be used for this purpose. Here there are once more the characteristic store 51 and counter 53 which addresses the store addresses for the partial ranges of a characteristic. The partial ranges within the characteristics are addressed by counter 81 where the counter 41 shown on FIG. 7 cannot be used for this purpose. Here too, it is assumed that counters 53 and 81 are at first in the initial position. Beat pulses on line 12 cause counter 81 to pass in succession through all its positions, when the frequencies of all partial ranges of the first characteristic stored in characteristic store 51 are supplied in succession to that output and taken to a comparator 83 and a register 85. The other input of comparator 83 is connected to the output of register 85. The output of comparator 83 actuates the transfer of a value into the register wheneven the value supplied by characteristic store 51 is greater than the value contained in register 85. Thus, after one cycle of counter 81, when the frequencies of all partial ranges of a characteristic have appeared at the output of characteristic store 51, register 85 receives the highest frequency detected. This value is taken to one input of a multiplier 87, the other input of which is connected to the output of store 89 and the output of which is connected to the data input of store 89. Store 89 is designed as a product accumulator, e.g. a register, and initially contains the value 1 as a threshold.

Once the counter has gone through all its positions, it provides a signal at output U which writes the output signal of multiplier 87 into store 89, sets register 85 to zero and shifts counter 53 on by one position. Counter 81 now addresses the store addresses for the partial ranges of the second characteristic in succession and at the end register 85 receives the maximum frequency occurring in this second characteristic which is multiplied by the first frequency stored in store 89 and stored therein. This process takes place in succession for all characteristics, so that eventually store 89 receives the product of the frequencies of all the characteristics.

During the test phase, this product of the maximum frequencies is hardly ever attained since the signal to be checked nearly always differs from the values most frequently occurring during the sampling phase. Thus the similarity threshold must be found by multiplying the product found for the maximum frequencies by a number smaller than 1. To this end, the input of multiplier 87 may be disconnected from the output of register 85 and changed over to a fixed value smaller than 1 or one which depends upon the signals during the sampling phase. Then store 89 once again receives a transfer beat so that it finally contains the valid similarity threshold used for subsequent verification.

If the output of register 85 is connected to the input of logarithm arrangements as well as to the comparator 83, multiplier 87 may be replaced by an adder, one input of which is connected to the output of the logarithm arrangement. This may be of advantage, since an adder is of substantially simpler design and works more rapidly than a multiplier. It is thereby possible for the logarithm arrangement to consist, for example, simply of a test value store addressed by register 85. Store 89, which in this instance contains the initial value zero or, better still, an initial value corresponding to the logarithm of the number by which the product of the maximum frequencies is multiplied to determine the similarity threshold, then at the end of the threshold determination directly contains the logarithm of the similarity threshold. This threshold or its logarithm available at the output of store 89 is taken via line 88 to the signal verification arrangement.

Figure 8:
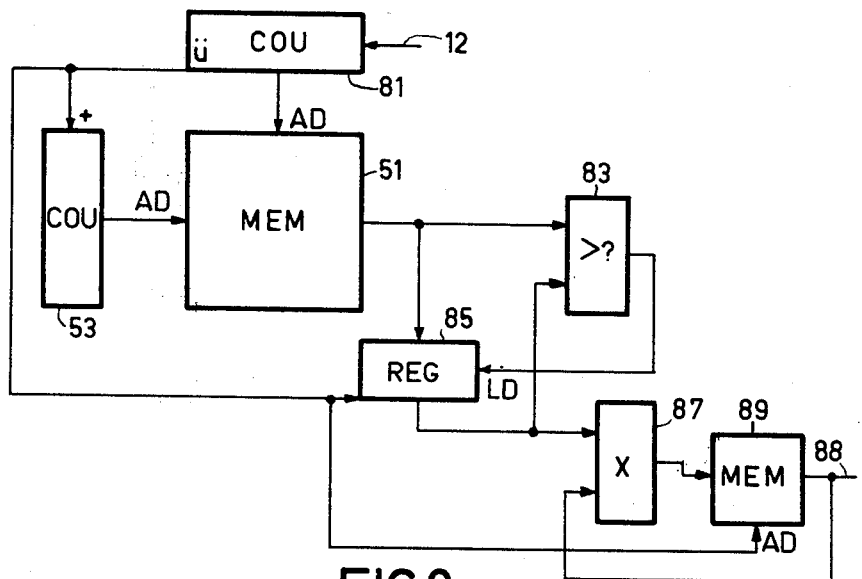
FIG. 8 is an arrangement for finding the similarity threshold.
Figure 9:
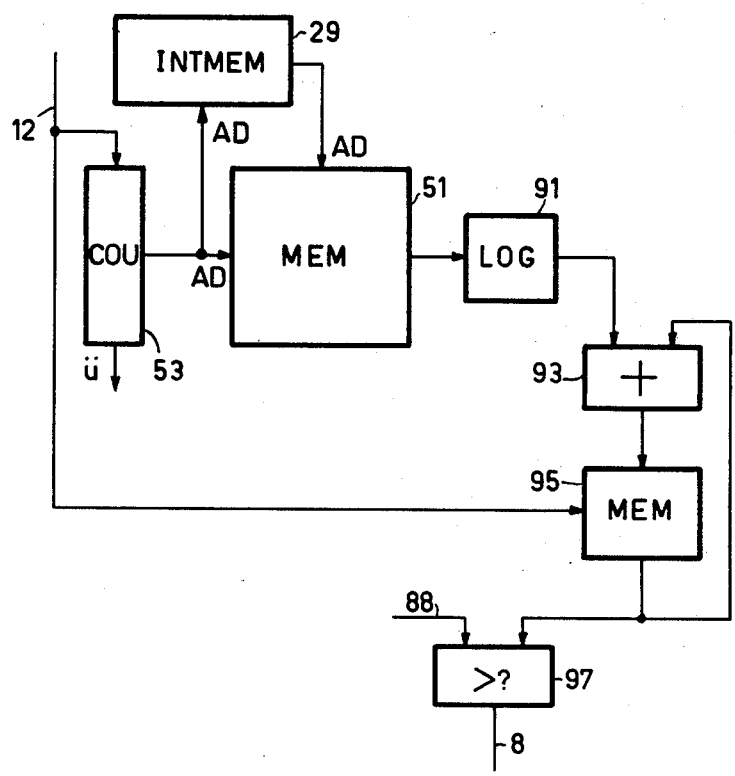

A verifying arrangement is shown on FIG. 8. It once more contains characteristic store 51 and counter 53 which addresses the store addresses of all partial ranges of a characteristic. The store addresses of a given partial range are selected by the content of the store address of intermediate store 29 which is also addressed by counter 53. This store 29 once again contains the numbers of the partial ranges into which the characteristic values of the signal to be verified have fallen. Counter 53, which is shifted by beat pulses on line 12, thus causes the successive read-out of the frequency of a partial range of each characteristic stored in characteristic store 51 and its transfer to a logarithm arrangement 91. Its output is connected to one input of an adder 93, the other input of which is connected to the output of a store 95 and the output of which is connected to the data input of said store 95. In addition, store 95 receives the beat pulses on line 12 as a transfer beat. The logarithms of all frequencies read out from characteristic store 51 are thus summated in store 95, so that, after a complete cycle of counter 53, once all characteristics have been processed, store 95 finally contains the logarithm of the product of the frequencies read out. This produces the completion of the multiplication of the frequencies as indicated in the description of FIG. 8 by means of the summation of the logarithms. Instead, logarithm arrangement 91 may be omitted and adder 93 replaced by a multiplier.

The result finally obtained in store 95 is taken to one input of a comparator 97, the other input of which receives the similarity threshold or its logarithm from the arrangement shown on FIG. 8 via line 88. The signal on output line 8 of comparator 97 (cf. FIG. 2) then shows whether the value received in the store is greater than the similarity threshold on line 88, indicating successful verification, or the opposite. If desired, the signal on line 8 may be validated by a transfer signal from counter 53 indicating that the process of verification has been terminated.

So far only the verification of signals of one class or voice signals from a single speaker has been described. The verification of several speakers, for instance, is also possible in the same manner. For this purpose characteristic store 51 must be suitably extended to store separately the frequencies of all partial ranges of all characteristics of various speakers, and in addition characteristic store 51 must have additional address inputs via which, for instance, a speaker number fed in can be used to select the range in the store allocated to this speaker both during the sampling and during the test phases.

The similarity threshold which may be obtained, for instance, in accordance with FIG. 8, is best obtained separately for every speaker or every class, since the frequency distributions in the individual classes may vary widely. To avoid having to determine the similarity threshold afresh before every verification process, the similarity thresholds for all classes are determined at the end of the sampling phase and then put into a buffer store. This buffer storage must also be performed by addressing by means of the class or speaker numbers. Characteristic store 51 may also be used for this store, so that the similarity threshold is stored following the frequencies of the partial ranges of the last characteristic of the class or speaker concerned.

If the arrangement is to be suitable for the verification of several speakers, as may be necessary, for example, for identification purposes in banking, characteristic store 51 must have a very considerable capacity. It can therefore be useful to issue the frequencies obtained during the sampling phase in store 51 of the arrangement of FIG. 6 or 7, including the similarity threshold, and record them on a storage medium, e.g. the magnetic strip of a suitable personal ID card. In this case, where the storage capacity on the magnetic strip is limited, the frequencies are stored in coded form, e.g. by means of a differential code. Here, this ID card is scanned before or during the issue of a voice sample, the content is decoded and written into store 51 so that, at the end of the voice sample the corresponding frequencies of the partial ranges appropriate to this voice sample can be processed. In this way, the number of speakers who can be checked thus is virtually unlimited. It is also possible to use an ID card with an incorporated semiconductor store on a single semiconductor chip. Such a store has a considerable capacity, thus obviating the need to code the frequencies. The store can here be used not only for the buffer storage of the frequencies, but also the entire arrangement, at least from analog-digital converter 17 of FIG. 3 onwards, can be integrated on a semiconductor chip and incorporated with the ID card. This makes it impossible to forge the data on the ID card, i.e. to insert the frequencies of a speaker to be imitated but who is not present. With the use of a buffer store like the ID card, the sampling phase may be extended over a longer time in order to include varying physical conditions and moods when the voice sample is given. Before a fresh voice sample is given, the former values are read into characteristic store 51 each time and suitably complemented. Such a procedure may also be performed following every successful verification, by again processing the signal to be verified as a sample signal and increasing the corresponding frequency values in characteristic store 51 in the same way as for the preceding sample signals. When buffer store 29 of the arrangement of FIG. 6 is used, the values contained therein may be used directly for post-sampling.

A difficulty may arise in this post-sampling in that the capacity of the individual store addresses of characteristic store 51, i.e. the length of the binary numbers storable therein, is limited. In the sampling phase, the number of samples may be equal to or smaller than the maximum value of the storable binary number, so that the maximum frequency occurring in a partial characteristic is never greater than the maximum value of the storable binary number. In the post-sampling process described above, this frequency may nevertheless be exceeded by successfully verified signals or voice samples. In order to allow for this, on FIG. 6 the output of adder 55 is connected to one input of a comparator 57, which receives at its other input the maximum value M of the storable binary number as a fixed value. As soon as this maximum occurs at the output of adder 55, said value is still written into characteristic store 51, but comparator 57 also generates an output signal on line 59 which is taken to the superior cycle control, e.g. control arrangement 9 of FIG. 2. Said arrangement 9 then sets changeover switch 58 to the opposite position at the end of the processing of the entire signal so that the data input of store 51 is connected to the output of a divider arrangement 56, the input of which is connected to the output of store 51. In the simplest case, this divider arrangement 56 causes an advance by one position and thus division by 2. At the same time, by actuation of counter 53 and another counter connected to the other address input, e.g. counter 41 of FIG. 7, the frequencies of all partial ranges of all characteristics are read out in succession, divided in divider arrangement 56 by a predetermined number, e.g. 2 as indicated above, and re-written into the original store address. The frequencies are thus reduced proportionally by the same factor. In addition, the similarity threshold must then be re-calculated. It is now possible once more to process signals or voice samples for post-sampling until the maximum frequency is again reached in a characteristic. The most recently used sample signals are thus given greater weight, or, in other words, the sample signals initially used become less influential with every division procedure, but this is a thoroughly desirable effect, especially in voice samples, since it is possible in this way to allow for changes in the voice through aging.

The arrangements described represent only embodiments of the method of the invention. In particular, some or all of the stores, counters, comparators and adders may be included in one component, the inputs of which are suitably rearranged. It may be of particular advantage to implement the method by using the embodiments described in the form of a permanently programmed microprocessor. Here, the different stores are embodied in various storage sections of the microprocessor. The various comparator and adder functions are performed by the processor component (ALU) of the microprocessor.

What is claimed is:

1. A method of verifying a finite signal pattern with various features, each subject to quantitative variability, involving the following steps;
   a. in a learning phase, supplying a predetermined number of signal patterns and for each characteristic drawing up a histogram giving the number of times that the characteristic concerned had a value within a range of values of a collection of adjacent value ranges applicable to the feature;
   b. in a test phase, supplying the signal pattern to be verified and detecting the value for each of said characteristics in order to indicate the value range belonging to said feature within the collection appropriate to said feature;
   c. multiplying the histogram values of the value ranges thus indicated for all said features of the signal to be verified to give an end product wherein every factor of said end product is different from zero; wherein said step further comprises:
   d. in order to standarize a signal pattern supplied, multiplying the detected value of each feature by a factor $(1+e)$ where $e<<1$ to give a corrected value, and repeating this each time for all corrected values thus found until an aggregate value derived from the corrected values applying exceeds an aggregate threshold;
   e. comparing said end product with a standard value in order to signal verification only if the standard value is exceeded.

2. A method as claimed in claim 1, further including: deriving the total signal value by the summation of the values of the features.

3. A method as claimed in claim 1 further including, after the learning phase, forming the similarity threshold from the multiplication of the maximum occurrency values of the individual features.

4. A method as claimed in claim 1 further including, after a successful verification, a fresh learning phase is carried out in which the occurrency values of those partial ranges into which the values of the features of the signal to be verified have fallen are increased by 1.

5. A method as claimed in claim 4, further including dividing all occurrency values by a constant divisor after an occurrency value has exceeded a predetermined value.

6. A method as claimed in claim 1 wherein the signal is a voice signal of limited duration and the features are adjacent frequency spectrum ranges, whereby the energy of the voice signal is integrated separately in successive equal time intervals per spectrum range and the individual integrals are separately summated over the entire voice signal and the spectrum sums represent the feature values.

7. A method as claimed in claim 6, wherein, in order to establish the partial ranges into which the individual spectrum sums fall, during the voice signal the partial sum obtained for each spectrum range after every summation of a further integral is compared with the upper limit of a partial range and the content of an intermediate store location allocated to the spectrum range concerned is raised by 1 whenever the partial sum exceeds the limit, whereupon the comparison with the upper limit of the next higher partial range is carried out.

8. A method as claimed in one of claims 6, wherein the frequencies obtained during the sampling phase are stored on a data support and automatically read in and stored to verify on the supply of the voice signal to be verified.

9. An arrangement for implementing the method as claimed in claim 1 comprising, a feature store (51) with a store location for each partial range of each feature; a first addressing arrangement (53) which addresses the store locations of all partial ranges of a feature and a second addressing arrangement (29, 41) which addresses a partial range every time; a range limit store (23) controlled by at least the second addressing arrangement; a comparator device (25) which compares the values of the features with a corresponding range limit read out from the range limit store (23) and produces a signal at a value smaller than the compared range limit but greater than the range limit of the preceding range limit; said signal reading out the store address of the feature store (51) addressed at the same time as the range limit store and during the sampling phase raising the read out content in an occurrency value adder (55) by 1 and writing it again into the same store location and during the test phase takes it to a processing unit (91, 93, 95) which multiplies this content by the contents of the store locations read out for the other features and takes it to a similarity comparator (97), the other input of which receives the similarity threshold and the output (98) of which supplies the result of verification.

10. An arrangement as claimed in claim 9 for the verification of a limited-duration voice signal, whereby the features are adjacent frequency spectrum ranges, wherein the energy of the voice signal is separately integrated in consecutive equal time intervals per spectrum range and the individual integrals are separately summated over the entire voice signal and the spectrum values represent the values of the features, whereby the electrical voice signal generated by a microphone passes through a filter bank which divides the voice signal into a number of frequency spectrum ranges and separately integrates the energy in the individual spectrum ranges during consecutive equal-length time intervals and the integrated signals are taken to an accumulator from spectrum value adder and a long-term spectrum store with a store location allocated to each spectrum range, which summates the integrated signals per spectrum range, whereby the comparator arrangement (25) receives the intermediate sum of each spectrum range generated by the spectrum value adder (19) and compares it with the range limit read out from the range limit store (23), in which the second addressing arrangement includes an intermediate store (29) with a special store location per spectrum range which is addressed by the first addressing arrangement (53) and from which the content read out is increased via a further adder (27) by one unit if the comparator arrangement (25) shows that the intermediate sum is greater than the range limit read out, said content thereafter being re-written into the intermediate store (29), and where the output of the intermediate store provides the addresses of the second addressing arrangement.

11. An arrangement as claimed in claim 10, wherein the range limit store (29) receives a special range limit value for each feature and each partial range and where the first addressing arrangement (53) also addresses the range limit store (29).

12. An arrangement as claimed in claim 10, wherein the feature store (51) contains the value 1 in all store addresses before the start of the first sampling signal.

* * * * *